US009848309B2

(12) United States Patent
Libonate et al.

(10) Patent No.: US 9,848,309 B2
(45) Date of Patent: *Dec. 19, 2017

(54) ADDING A UNIQUE IDENTIFICATION HEADER TO NON-OPERATOR NETWORK COMMUNICATION

(71) Applicant: Verizon Patent and Licensing Inc., Arlington, VA (US)

(72) Inventors: Brian Libonate, Walnut Creek, CA (US); Stephen D. Morrison, Watertown, MA (US); Gaurav Gupta, Waltham, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/395,854

(22) Filed: Dec. 30, 2016

(65) Prior Publication Data

US 2017/0111778 A1    Apr. 20, 2017

Related U.S. Application Data

(62) Division of application No. 14/601,490, filed on Jan. 21, 2015, now Pat. No. 9,602,992.

(51) Int. Cl.
| *H04W 4/00* | (2009.01) |
| *H04W 4/20* | (2009.01) |
| *H04W 8/18* | (2009.01) |
| *H04W 8/22* | (2009.01) |
| *H04W 88/06* | (2009.01) |
| *H04L 29/08* | (2006.01) |

(52) U.S. Cl.
CPC ............ *H04W 4/206* (2013.01); *H04W 8/18* (2013.01); *H04W 8/22* (2013.01); *H04L 67/00* (2013.01); *H04W 88/06* (2013.01)

(58) Field of Classification Search
CPC . G06F 15/16; G06F 9/34; G06F 17/30; H04L 45/745; H04L 69/22; H04L 45/74;
(Continued)

(56) References Cited

U.S. PATENT DOCUMENTS 6,487,538 B1    11/2002  Gupta et al.
7,366,523 B2    4/2008   Viikari et al.
(Continued)

FOREIGN PATENT DOCUMENTS

WO    2000/067450    11/2000
WO    2000/73876     12/2000
WO    2006/081680    8/2006

OTHER PUBLICATIONS

Wikipedia, "Online advertising," http://en.wikipedia.org/wiki/Online_advertising, Dec. 18, 2014, 21 pages.
(Continued)

*Primary Examiner* — Kwasi Karikari

(57) ABSTRACT

A device may receive an identifier for a subscriber of a first network. The subscriber may be associated with the device. The device may store the identifier and receive a request for content. The device may generate a modified request by adding the identifier to the request. The device may send the modified request using a network communication. The network communication may communicate via a second network without using the first network, and the first network may be different than the second network. The device may receive the content and targeted content based on the modified request. The targeted content may be targeted to the subscriber based on the identifier.

20 Claims, 8 Drawing Sheets

(58) Field of Classification Search
CPC ... H04L 45/742; H04L 63/12; H04L 65/4084; H04L 67/22; H04L 67/2814; H04L 67/306; H04L 12/287; H04L 29/12009; H04L 29/12018
USPC .................................................. 455/426.1
See application file for complete search history.

(56) References Cited

U.S. PATENT DOCUMENTS

| | | |
|---|---|---|
| 7,657,594 B2 | 2/2010 | Banga et al. |
| 8,862,747 B2 | 10/2014 | Shah et al. |
| 9,060,031 B1 | 6/2015 | Taylor |
| 2001/0020242 A1 | 9/2001 | Gupta et al. |
| 2005/0172154 A1 | 8/2005 | Short et al. |
| 2012/0011266 A1* | 1/2012 | Avasarala .......... H04N 21/2387 709/231 |
| 2013/0318346 A1* | 11/2013 | Libonate .............. H04L 43/16 713/168 |
| 2016/0212602 A1 | 7/2016 | Libonate et al. |

OTHER PUBLICATIONS

"Microsoft Product Activation for Windows XP", Technical Details on Microsoft Product Activation for Windows XP, 8 pages, Aug. 2001.

* cited by examiner

ADDING A UNIQUE IDENTIFICATION HEADER TO NON-OPERATOR NETWORK COMMUNICATION

RELATED APPLICATION

This application is a divisional of U.S. patent application Ser. No. 14/601,490, filed Jan. 21, 2015, which is incorporated herein by reference.

BACKGROUND

Operator networks transport network traffic associated with a variety of services, applications, and content. Content providers may transmit services, applications, and/or content that subscribers, associated with the operator network, cannot use and/or do not desire to receive (such as an advertisement in which a subscriber is not interested). In efforts to remedy this, the content providers may provide services, applications, and/or content that are targeted to the subscribers.

DETAILED DESCRIPTION OF PREFERRED EMBODIMENTS

The following detailed description of example implementations refers to the accompanying drawings. The same reference numbers in different drawings may identify the same or similar elements.

While content providers may desire to use information associated with subscribers of an operator network to determine targeted content, the operator network may not permit content providers to access such information due to security concerns, such as protecting identities of the subscribers and/or safeguarding confidential information associated with the subscribers. Accordingly, the operator network may generate a UIDH by encoding an identifier associated with the subscriber and/or a key that is valid for a period of time.

When the operator network receives a request for content from a user device to be sent to a content server, the operator network may insert the UIDH into the request for content received from the user device, being used by the subscriber, to create the modified request. The operator network may provide the modified request to a content server. Providing the modified request to the content provider may enable the content provider to identify targeted content, associated with the UIDH, that conforms to one or more of attributes of the subscriber without knowing the identity of the subscriber. Thus, the content provider may provide targeted content to a user device without knowing the identity of the subscriber.

However, rather than sending the request for content via the operator network, if a subscriber uses the user device to send the request for content via another communication method (e.g., a Wi-Fi connection, a wired connection, or the like), then the operator network may not have the opportunity to insert the UIDH into the request. Thus, the content server may not be able to determine targeted content to provide to the subscriber.

Implementations described herein may permit a UIDH, generated for a subscriber of an operator network, to be added to a content request even when the content request is not sent via the operator network. Accordingly, the subscriber may be provided with targeted content, based on the UIDH, even when the subscriber is not using the operator network to communicate.

Figure 1A:
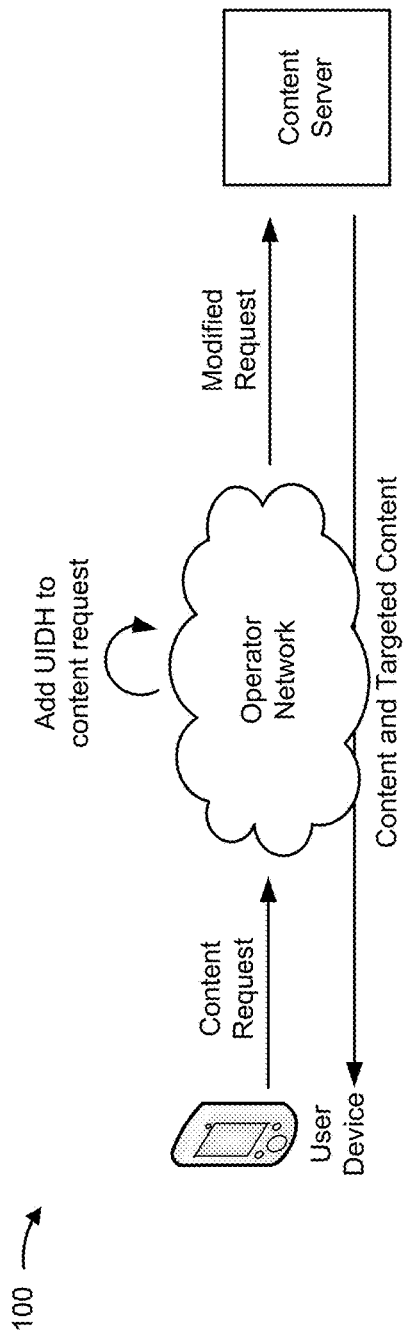
FIGS. 1A-1C are diagrams of an overview of an example implementation described herein.
Figure 1B:
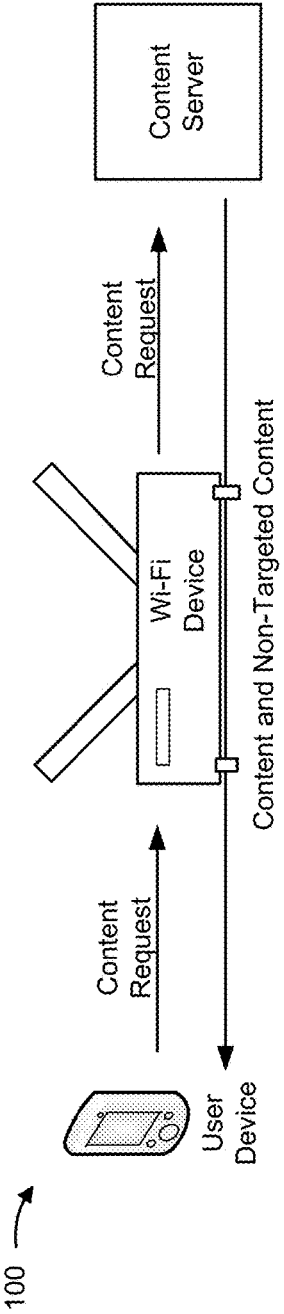
Figure 1C:
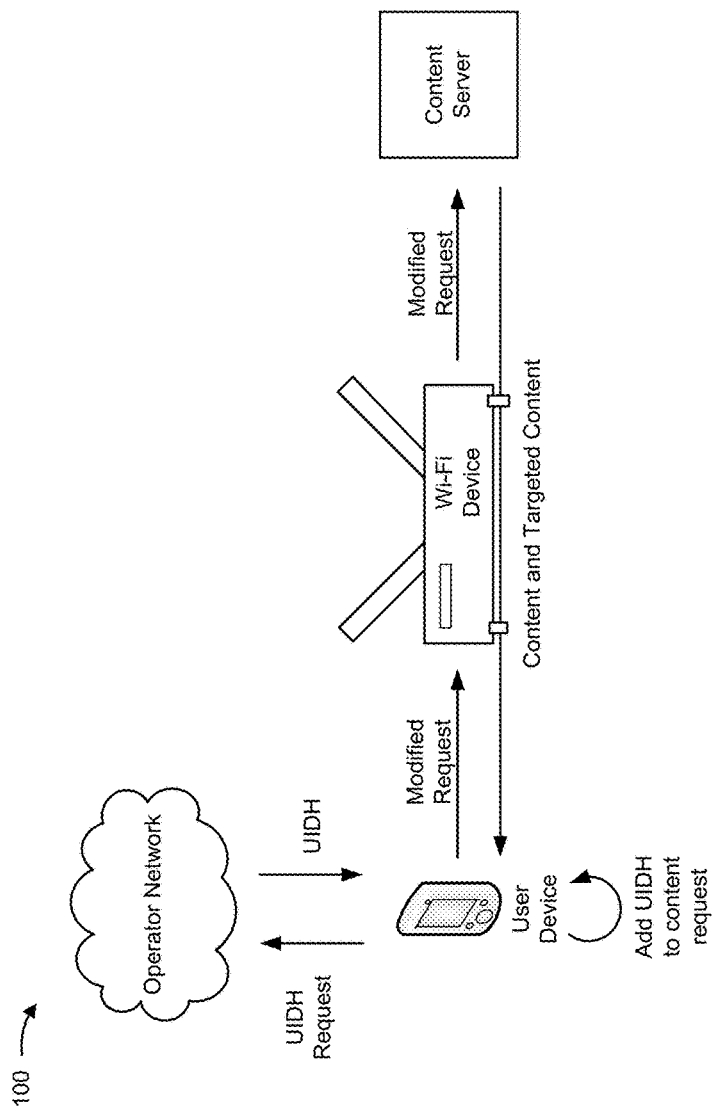

FIGS. 1A-1C are diagrams of an overview of an example implementation 100 described herein.

As shown in FIG. 1A, a user device may send a content request (e.g., a request for a webpage) to a content server via an operator network. The operator network may receive the content request and generate a modified request by adding a UIDH to the content request. The operator network may send the modified request (e.g., the content request and the UIDH) to the content server. The content server may obtain content requested by the modified request. The content server may also obtain targeted content (e.g., an advertisement to insert into the webpage) based on the UIDH included in the modified request. The targeted content may be selected to conform to an attribute of the subscriber (e.g., an age of the subscriber, a gender of the subscriber, a geographic area of the subscriber, or the like) without the identity of the subscriber being known to the content server. The content server may send the content and the targeted content to the user device (e.g., via the operator network). The user device may receive the content and the targeted content and display the content and the targeted content to a user (e.g., the subscriber). Accordingly, when a user device sends a content request via an operator network, the operator network has the opportunity to add the UIDH to the content so that the user device may be provided targeted content associated with an attribute of the subscriber without the identity of the subscriber being shared with a content provider.

On the other hand, as further shown in FIG. 1B, a user device may send a content request (e.g., a request for a webpage) to a content server via a non-operator network communication. For example, the user device may use a Wi-Fi communication to send the content request via a Wi-Fi device (e.g., a home router). The Wi-Fi device may receive the content request and send the content request to the content server without using the operator network. Accordingly, the operator network does not have the opportunity to add the UIDH for the subscriber into the content request. The content server may receive the content request without any information identifying the subscriber. Thus, the content server may send the requested content and non-targeted content (e.g., a random advertisement or an advertisement based on the content requested) to the user device. The user device may receive the content and the non-targeted content and display the content and the non-targeted content to a user (e.g., the subscriber).

However, as shown in FIG. 1C, a user device may request a UIDH from an operator network and receive information identifying the UIDH from the operator network. When the user device detects a content request is to be sent using a non-operator network communication (e.g., a Wi-Fi communication), the user device may add the UIDH to the content request to generate a modified request. The user device may send the modified request to the content server via the non-operator network communication. The content server may receive the modified request and obtain content requested by the modified request. The content server may also obtain targeted content based on the UIDH included in the modified request. The content server may send the content and the targeted content to the user device (e.g., via the non-operator network communication). The user device may receive the content and the targeted content and display the content and the targeted content to a user (e.g., the subscriber).

In this way, a user device may receive targeted content, which conforms to an attribute of a subscriber of an operator network, even when the user device sends a request using a non-operator network communication.

Figure 2:
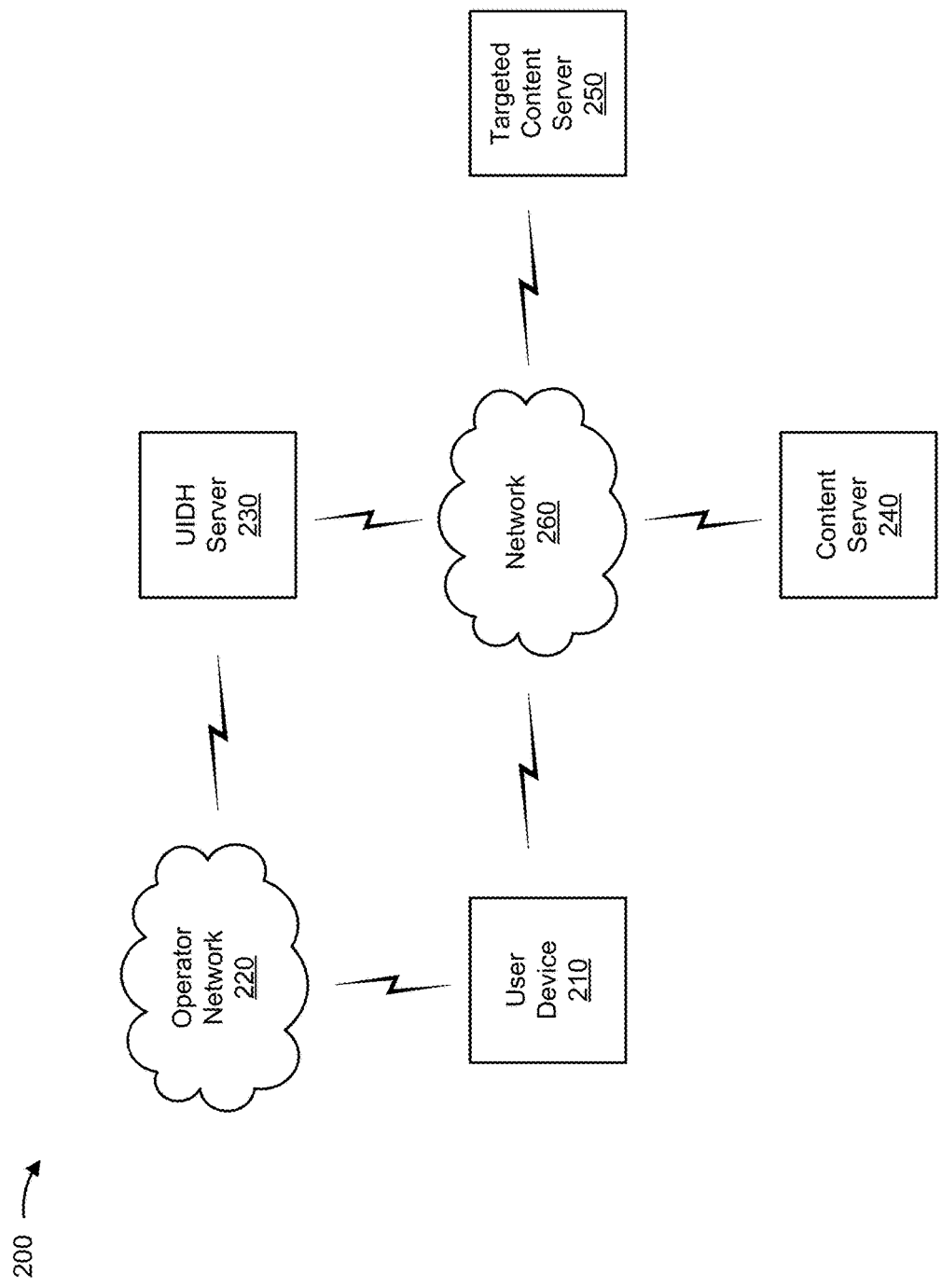
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, an operator network 220, a UIDH server 230, a content server 240, a targeted content server 250, and/or a network 260. Devices of environment 200 may interconnect via wired connections, wireless connections, or a combination of wired and wireless connections.

User device 210 may include one or more devices capable of receiving, generating, storing, processing, and/or providing information. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a set-top box, or a similar type of device. In some implementations, user device 210 may receive information from and/or transmit information to another device in environment 200. In some implementations, user device 210 may be configured to use an operator network communication (e.g., long term evolution (LTE) communication, third generation (3G) communication, cellular communication, or the like) to communicate with another device when user device 210 communicates with the other device via operator network 220. Additionally, or alternatively, user device 210 may be configured to use a non-operator network communication (e.g., Wi-Fi, Bluetooth, Near Field Communication (NFC), or the like) when user device 210 communicates with another device independent of operator network 220. In some implementations, a proxy application may be installed on and executed by user device 210. Data (e.g., content requests) to be sent via non-operator network communication and/or operator network communication may be filtered through the proxy application before being sent to another device.

Operator network 220 may include an evolved packet system (EPS) that includes a LTE network and/or an evolved packet core (EPC) that operate based on a third generation partnership project (3GPP) wireless communication standard. The LTE network may be a radio access network (RAN) that includes one or more base stations, such as eNodeBs (eNBs), via which user devices 210 communicate with the EPC. The EPC may include a serving gateway (SGW), a mobility management entity device (MME), and/or a packet data network gateway (PGW) that enables the client devices to communicate with network 260 and/or an Internet protocol (IP) multimedia subsystem (IMS) core. The IMS core may include a home subscriber server (HSS)/authentication, authorization, accounting (AAA) server, a policy and charging rules function (PCRF) server, and/or a call session control function (CSCF) server and may manage certain information and services, such as authentication, session initiation, account information, and/or a user profile, associated with the client devices. The LTE network may include multiple base stations, and the EPC may include multiple SGWs, MMEs, and/or PGWs. Additionally, or alternatively, operator network 220 may include a public land mobile network (PLMN), a second generation (2G) network, a 3G network, a fourth generation (4G) network, a fifth generation (5G) network, and/or a similar type of network.

UIDH server 230 may include one or more server devices capable of storing, processing, and/or routing information. In some implementations, UIDH server 230 may include a communication interface that allows UIDH server 230 to receive information from and/or transmit information to other devices in environment 200. In some implementations, UIDH server 230 may be included in operator network 220. In some implementations, UIDH server 230 may generate UIDHs and store information associating UIDHs, user devices 210, subscribers, and/or attribute information for subscribers. As used herein, a user of user device 210 may be a subscriber to a wireless service provided by operator network 220.

Content server 240 may include one or more server devices, or other types of computation and communication devices, that provide any type or form of content. For example, content server 240 may provide video, audio, images, advertising content, webpages, text, data, and/or some combination thereof. Additionally, or alternatively, content server 240 may provide applications and/or services, such as games, scripts, messaging services, banking services, etc. In some implementations, content server 240 may communicate with a particular user device 210 to perform electronic transactions to provide a good and/or service in exchange for payment information from user device 210. Additionally, or alternatively, content server 240 may receive, from targeted content server 250, targeted content, such as advertising content, which corresponds to a UIDH and may provide, via the particular user device 110, the targeted content and/or other content to user device 210 and/or the subscriber with which the UIDH is associated.

Targeted content server 250 may include one or more server devices, or other types of computation and communication devices, that provide advertising content. Targeted content server 250 may, for example, maintain targeted content, such as advertising content, which corresponds to UIDHs associated with subscribers of operator network 220. Particular advertising content, corresponding to one or more UIDHs, may, for example, conform to attributes of the subscribers with which the UIDHs are associated. Targeted content server 250 may also, or alternatively, provide advertising content, to content server 240, that corresponds to a UIDH received from content provider 240.

Network 260 may include one or more wired and/or wireless networks. For example, network 260 may include a cellular network (e.g., a LTE network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
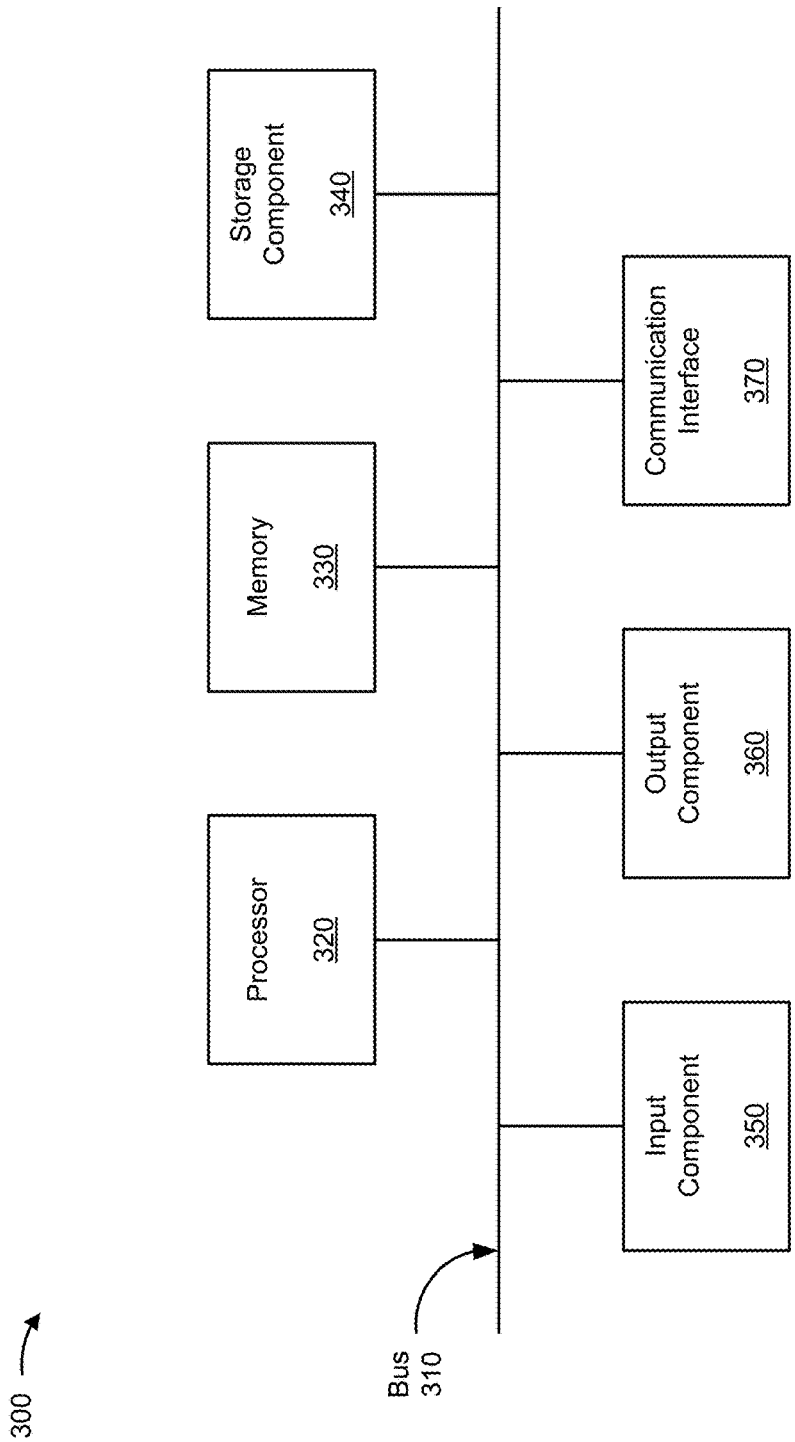
FIG. 3 is a diagram of example components of one or more devices of FIG. 2.

FIG. 3 is a diagram of example components of a device 300. Device 300 may correspond to user device 210, UIDH server 230, content server 240, and/or targeted content server 250. In some implementations, user device 210, UIDH server 230, content server 240, and/or targeted content server 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
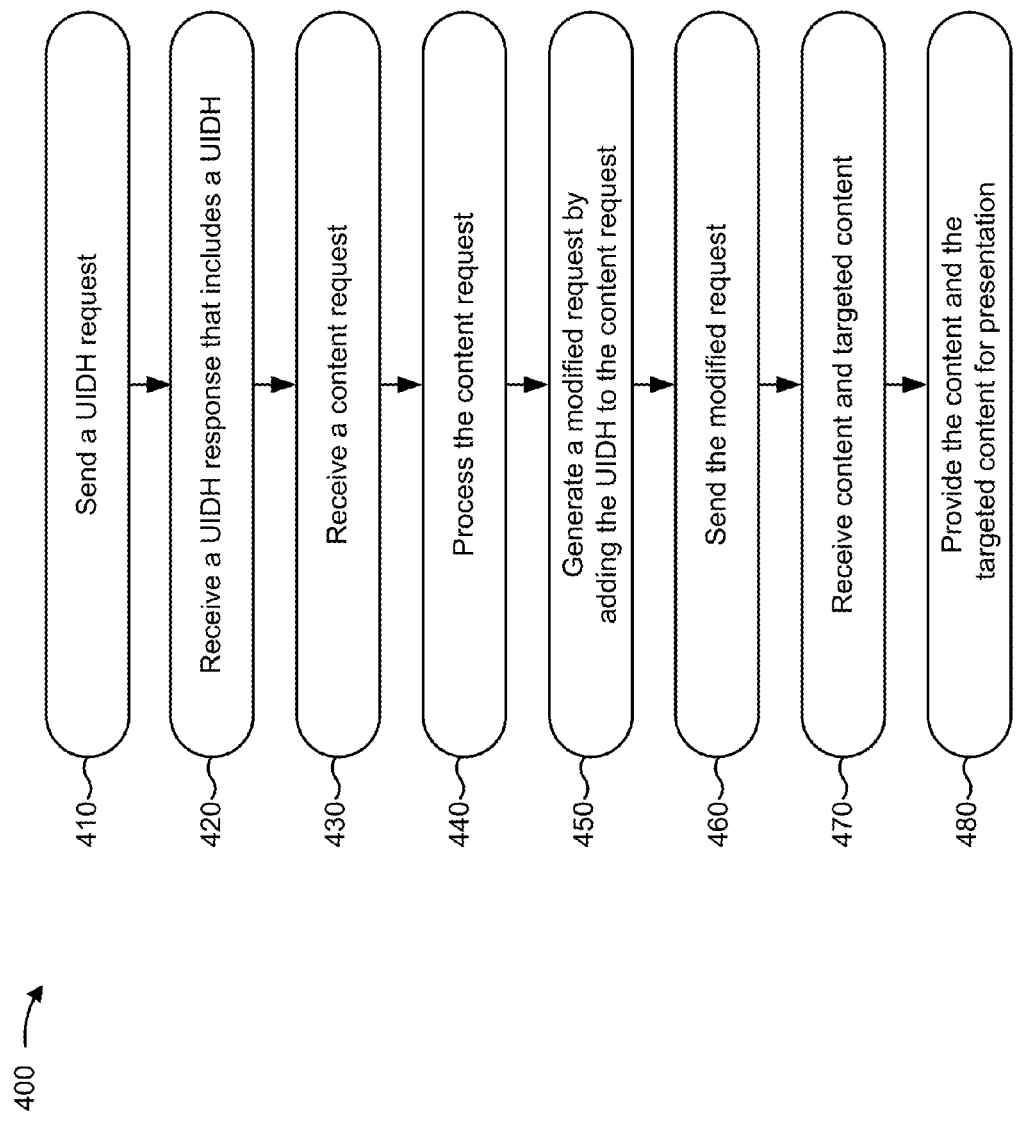
FIG. 4 is a flow chart of an example process for including a unique identification header (UIDH) in data sent via a non-operator network communication.

FIG. 4 is a flow chart of an example process 400 for including a UIDH in data sent via a non-operator network communication. In some implementations, one or more process blocks of FIG. 4 may be performed by user device 210. Additionally, or alternatively, one or more process blocks of FIG. 4 may be performed by another device or a group of devices separate from or including user device 210, such as UIDH server 230, content server 240, and/or targeted content server 250.

As shown in FIG. 4, process 400 may include sending a UIDH request (block 410). For example, user device 210 may send the UIDH request to UIDH server 230.

In some implementations, user device 210 may send the UIDH request to UIDH server 230 via operator network 220. Additionally, or alternatively, user device 210 may send the UIDH request to UIDH server 230 via network 260.

The UIDH request may request that UIDH server 230 send a UIDH to user device 210. The UIDH request may include information identifying user device 210 and/or a subscriber of user device 210. For example, the UIDH request may indicate a user device identifier that uniquely identifies user device 210 (e.g., a mobile device number (MDN), an international mobile subscriber identity (IMSI), an international mobile station equipment identify (IMEI), a mobile equipment identifier (MEID), or the like), an IP address for user device 210, and/or subscriber information for a subscriber associated with user device 210.

In some implementations, user device 210 may include a proxy application. The proxy application may be an application (e.g., a computer program) included in or associated with an operating system executed by user device 210. The proxy application may cause user device 210 to send the UIDH request to UIDH server 230. Additionally, or alternatively, and as will be discussed in more detail later, content requests may be forced through the proxy application by user device 210 before sending the content requests to other devices (e.g., content server 240).

In some implementations, user device 210 may send the UIDH request to UIDH server 230 based on a schedule and/or independent of any request for content. For example, user device 210 may send the UIDH request to UIDH server 230 once every hour, once every day, once every week, once every month, or the like. How often user device 210 sends the UIDH request may be based on how often the UIDH changes for a particular user device 210 and/or user. For example, UIDH server 230 may generate a new UIDH for user device 210 once every hour, once every day, once every week, once every month, or the like. In some implementations, user device 210 may send the UIDH request more often than UIDH server 230 changes the UIDH. For example, if UIDH server 230 updates the UIDH every seven days, user device 210 may send the UIDH request every day, every three days, every five days, or the like to ensure user device 210 stores a current UIDH for the subscriber.

In some implementations, user device 210 may send the UIDH request each time user device 210 receives a content request. Alternatively, user device 210 may send the UIDH request each time user device 210 determines a UIDH should be added to a received content request. Receiving the content request and determining whether the UIDH should be added to a received content request will be discussed in more detail later.

Additionally, or alternatively, user device 210 may send the UIDH request based on user device 210 connecting to operator network 220. For example, each time user device 210 connects to operator network 220 via a wireless connection (e.g., a LTE connection, a 3G connection, a cellular connection, or the like), user device 210 may send the UIDH request to UIDH server 230 via operator network 220.

UIDH server 230 may receive the UIDH request from user device 210. UIDH server 230 may store a data structure associating multiple UIDHs with multiple user devices 210 and/or subscribers. UIDH server 230 may update the UIDHs associated with user devices 210 at particular times (e.g., every day, week, month, etc.). For example, UIDH server 230 may generate a UIDH (or an updated UIDH) for a particular user device 210 and/or a particular subscriber based on a key, generated from a random number, and information associated with user device 210 and/or the subscriber (e.g., a MDN, a subscriber account number, a subscriber name, or the like). The UIDH may correspond to a string of alphanumeric characters and/or symbols that is valid for a predetermined period of time (e.g., 1 hour, 12 hours, 1 day, 3 days, 7 days, 14 days, etc.). Accordingly, information identifying user device 210 and/or a user may not be deciphered from the UIDH alone without the data structure associating the UIDH and the user device 210 and/or the user.

UIDH server 210 may query the data structure using the information, identifying user device 210 and/or the subscriber, included in the UIDH request and identify a UIDH associated with the user device 210 and/or the subscriber. UIDH server 210 may generate a UIDH response that includes the UIDH. UIDH server 210 may send the UIDH response to user device 210 based on the UIDH request.

As further shown in FIG. 4, process 400 may include receiving the UIDH response that includes the UIDH (block 420). For example, user device 210 may receive the UIDH response from UIDH server 230.

User device 210 may store the UIDH in a memory included in or accessible by user device 210. In some implementations, user device 210 may securely store the UIDH so that only the proxy application may access the UIDH. In other words, only the proxy application may have permission to access the UIDH stored by user device 210 and other applications stored by and/or executed by user device 210 may not have permission to access the UIDH stored by user device 210.

As further shown in FIG. 4, process 400 may include receiving a content request (block 430). For example, user device 210 may receive a content request from an application executed by user device 210.

In some implementations, an application may automatically generate the content request independent of a user input. For example, an application (e.g., a mobile application, an internet browser, or the like) may automatically generate a content request to be sent to content server 240. For instance, the content request may be related to requesting a software update for the application and/or a request related to other background information.

In some implementations, an application may generate a content request based on an input from a user. For example, a user may input a command into an application that causes the application to generate a content request to be sent to content server 240. For instance, a user may input a uniform resource locator (URL) into a browser application that causes the browser application to generate a content request for a document (e.g., a webpage) identified by the URL.

In some implementations, the content request may include a source address field, a destination address field, and/or a message type field. The source address field may indicate an address (e.g., an IP address) of user device 210. The destination address field may indicate an address (e.g., an IP address) of a device to which the content request is to be sent. The message type field may indicate a type of packet included in the content request (e.g., an HTTP request).

As further shown in FIG. 4, process 400 may include processing the content request (block 440). For example, user device 210 may process the content request using the proxy application.

In some implementations, user device 210 may determine a communication mode of user device 210. A communication mode may indicate a type of communication user device 210 will use to send the content request (e.g., a current communication mode). For example, an operator network communication mode may be a communication mode in which user device 210 uses LTE communication, 3G communication, and/or another form of communication that user device 210 uses to communicate with operator network 220. A non-operator network communication mode may be a communication mode in which user device 210 communicates with network 260 independent of operator network 220. For example, user device 210 may use Wi-Fi, Bluetooth, Near-Field Communication (NFC), RF communication, wired communication, or the like to communicate with network 260 without using operator network 220.

In some implementations, user device 210 may be configured to provide the content request to be processed by the proxy application before the content request is sent from user device 210 based on the communication mode of user device 210. For example, user device 210 may provide the content request to be processed by the proxy application based on the non-operator network communication mode being used by user device 210. Accordingly, in some implementations, the proxy application may process only content requests that are to be sent via a non-operator network communication (e.g., Wi-Fi) and may not process content requests to be sent via an operator network communication (e.g., LTE, 3G, or the like). The proxy application, and hence user device 210, may not have to process the content request, as described herein, that is to be sent via the operator network communication because operator network 220 may process the content request instead of user device 210. For example, operator network 220 may add a UIDH to a content request when transmitting the content request to the destination of the content request.

In some implementations, user device 210 may force all content requests, independent of the communication mode, to be processed by the proxy application. Accordingly, user device 210, via the proxy application, may process all content requests to be sent using an operator network communication mode and a non-operator network communication mode.

In some implementations, user device 210, via the proxy application, may process the content request by determining whether the UIDH should be included in the content request.

In some implementations, user device 210 may determine to add the UIDH to all content requests processed by the proxy application.

In some implementations, user device 210 may determine to selectively add the UIDH to a content request processed by the proxy application based on a destination address indicated by the content request. Additionally, or alternatively, user device 210 may determine to selectively add the UIDH to a content request processed by the proxy application based on a message type indicated by the content request. For example, user device 210 may determine to add the UIDH to the content request based on the content request being a HTTP request.

In some implementations, user device 210 may determine to selectively add the UIDH to a content request processed by the proxy application based on an application that generated the content request. For example, user device 210 may determine to add the UIDH to a content request based on a first application having generated the content request and may determine to not add the UIDH to a content request based on a second application having generated the content request.

In some implementations, user device 210 may determine to selectively add the UIDH to a content request based on whether the content request was generated based on a user input. For example, user device 210 may determine to add the UIDH to a content request generated based on user input. The UIDH may be added to such a content request because the content request being generated by a user may indicate that the user is likely to view content sent in response to the content request (e.g., a requested webpage) and that the UIDH may be used, by content server 240, to insert targeted content (e.g., an advertisement, login information, or the like) into the content. On the other hand, user device 210 may determine not to add the UIDH to a content request that was automatically generated by an application, independent of a user input. The UIDH may not be added to such a content request because there is a lower likelihood that a user will view content sent in response to the content request (e.g., a software update) and a lower likelihood that the UIDH may be used, by content server 240, to insert targeted content into the content.

In some implementations, user device 210 may determine to add the UIDH to the content request based on user device 210 being in the non-operator network communication mode.

Various factors have been discussed that may be the basis for determining to add the UIDH to the content request. User device 210 may determine to add the UIDH to the content request based on these factors individually or a combination of these factors. If a combination of factors is used, user device 210 may weight each factor differently when making the determination.

Selectively adding the UIDH to some content requests and not all content requests may reduce the amount of data sent from user device 210 while still allowing UIDHs to be included in content requests when the UIDH will be used to obtain targeted content for the subscriber. Accordingly, user device 210 may be able to communicate with other devices at a faster speed due to less data being exchanged. Moreover, traffic exchanged via network 260 (which may communicate the modified requests and/or content requests) may be reduced, thereby improving the performance of network 260 and reducing traffic congestion on network 260.

As further shown in FIG. 4, process 400 may include generating a modified request by adding the UIDH to the content request (block 450). For example, user device 210 may generate the modified request.

User device 210 may add the UIDH to the content request based on determining that the UIDH should be added to the content request. For example, user device 210 may add the UIDH to a content request to be sent via the non-operator network communication (e.g., when user device 210 is in the non-operator network communication mode).

In some implementations, user device 210, via the proxy application, may add the UIDH to a header, a footer, and/or a payload included in the content request. Additionally, or alternatively, user device 210, via the proxy application, may add the UIDH to a particular field included in the content request reserved for the UIDH. The content request with the added UIDH may be referred to as a modified request herein.

As further shown in FIG. 4, process 400 may include sending the modified request (block 460). For example, user device 210 may send the modified request to content server 240.

User device 210 may provide the modified request, including the UIDH, to content server 240 based on the destination address included in the modified request. For example, the destination address may identify an address for content server 240. In some implementations, user device 210 may provide the modified request via the operator network communication and/or the non-operator network communication based on the communication mode of user device 210.

When user device 210 sends the modified request using a non-operator network communication, it should be understood that an operator network, a network, and/or a service provider, different from operator network 220 that maintains the UIDH and/or that adds the UIDH to content requests sent via operator network 220, may still be used to transmit the modified request to content server 240. In some implementations, the modified request may initially be sent from user device 210 using a non-operator network communication, but the modified request may be sent (e.g., via network 260) using a RAN or another operator network during subsequent transmission to content server 240.

Content server 240 may receive the modified request and may obtain content identified by the modified request. Content server 240 may also, or alternatively, provide a targeted content request to targeted content server 250. The targeted content request may include the UIDH. The targeted content request may request that targeted content server 250 provide targeted content. Targeted content may include content that is targeted to a particular user and/or user device 210. For example, the targeted content may include an advertisement, login information (e.g., a username, a password, etc.), billing information (e.g., a credit card number, an address, etc.), or other information targeted to a particular user and/or user device 210.

In some implementations, targeted content server 250 may store the targeted content. Additionally, or alternatively, targeted content server 250 may store information associating the targeted content and UIDHs. For example, UIDH server 230 may provide information identifying UIDHs to targeted content server 250. In some implementations, UIDH server 230 may provide information about user device 210 and/or subscriber (e.g., demographic information of the user, preference information for the user, or other attributes) without identifying user device 210 and/or the subscriber. In other words, UIDH server 230 may provide information about attributes of a user associated with a UIDH without revealing the subscriber's identity to targeted content server 250. Accordingly, targeted content server 250 may select targeted content for user device 210 and/or a subscriber based on the UIDH, and/or attributes associated with the UIDH, without the identity of user device 210 and/or the subscriber being revealed to targeted content server 250.

Accordingly, targeted content server 250 may determine targeted content based on the UIDH included in the targeted content request received from content server 240. For example, targeted content server 250 may determine that the UIDH, obtained from the targeted content request, matches a UIDH that is stored in a memory associated with targeted content server 250. Targeted content server 250 may retrieve, from the memory, the targeted content that corresponds to the stored UIDH and may provide the targeted content to content server 240. Content server 240 may receive the targeted content and may combine content with the targeted content to create a response to the modified request received from user device 210.

As further shown in FIG. 4, process 400 may include receiving the content and the targeted content (block 470). For example, user device 210 may receive the content and the targeted content.

As further shown in FIG. 4, process 400 may include providing the content and the targeted content for presentation (block 480). For example, user device 210 may provide the content and the targeted content for presentation (e.g., display, audio output, or the like). For instance, user device 210 may cause the content and the targeted content to be displayed by a display device included in or associated with user device 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
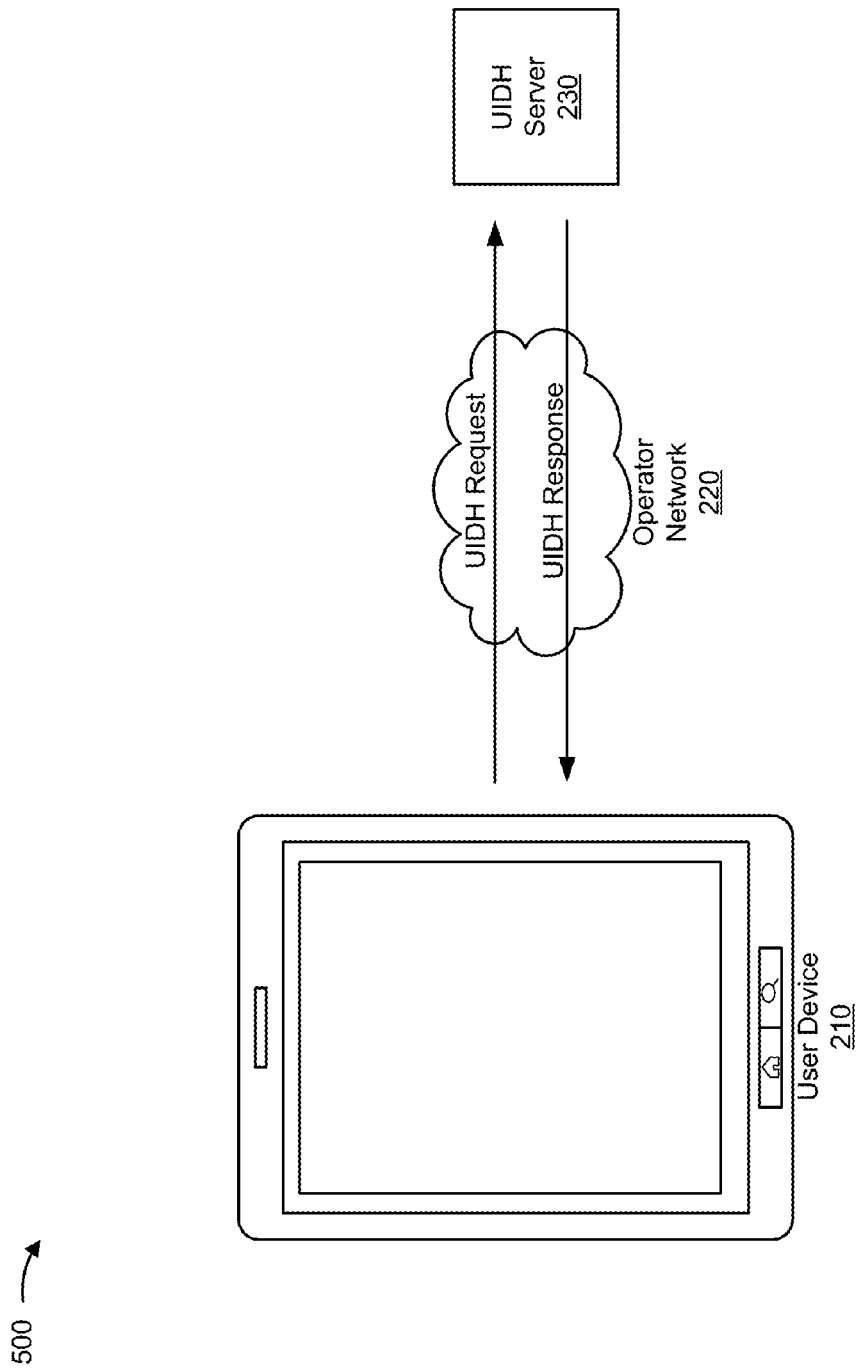
FIGS. 5A-5C are diagrams of an example implementation relating to the example process shown in FIG. 4.
Figure 5B:
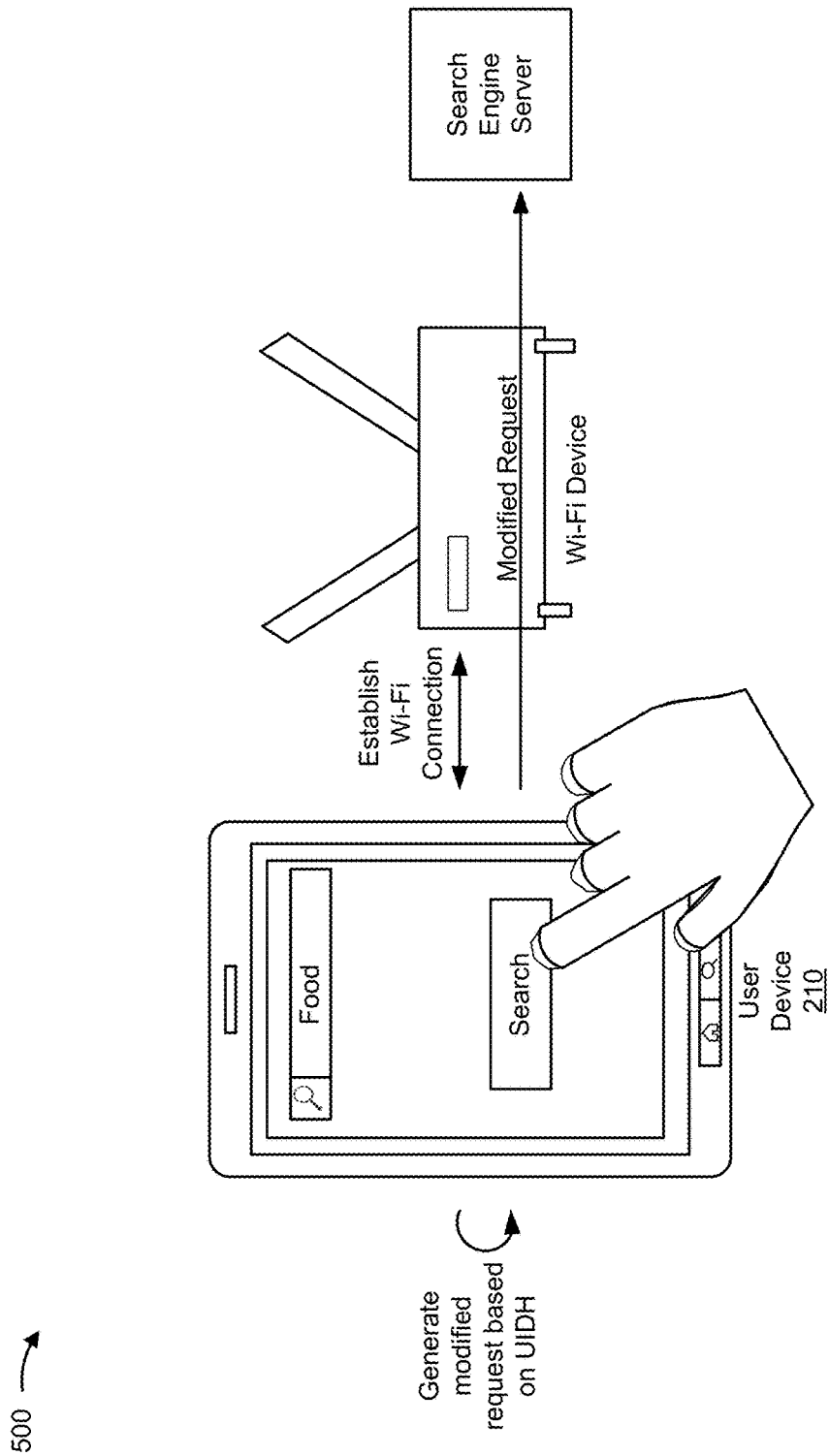
Figure 5C:
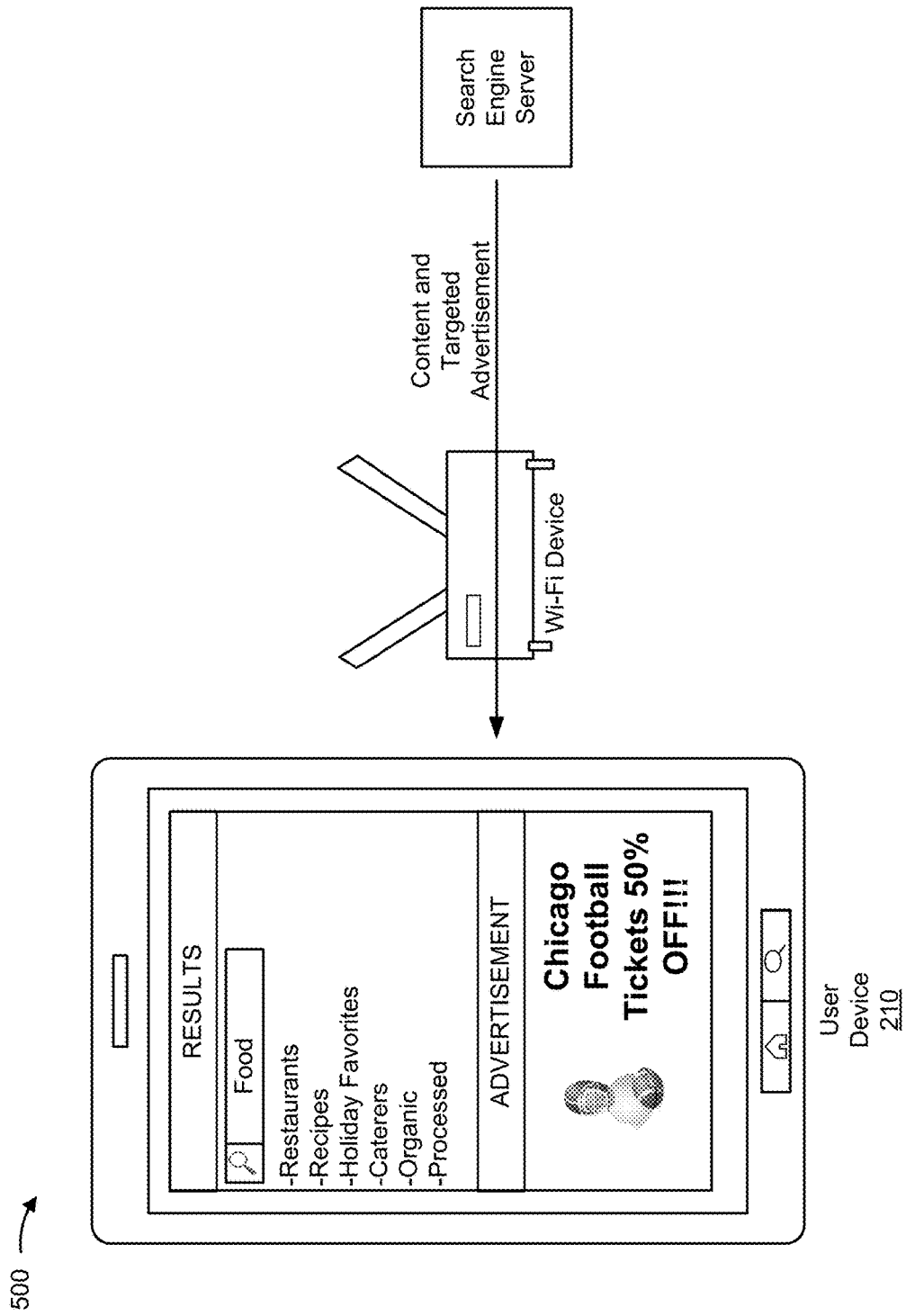

FIGS. 5A-5C are diagrams of an example implementation 500 relating to example process 400 shown in FIG. 4. FIGS. 5A-5C show an example of including a UIDH in data sent via a non-operator network communication.

In FIG. 5A, assume user device 210 is capable of communicating using LTE communication via operator network 220 (e.g., an operator network communication) and capable of communicating using Wi-Fi communication (e.g., a non-operator network communication). As shown in FIG. 5A, assume user device 210 connects to operator network 220 via LTE communication and sends a UIDH request to UIDH server 230 via the LTE communication. UIDH server 230 may receive the UIDH request and send a UIDH response to user device 210 via the LTE communication. The UIDH response may include information indicating a UIDH for a subscriber, of operator network 220, associated with user device 210. User device 210 may receive the UIDH response and store the UIDH in a memory that may be accessible only by a proxy application executed by user device 210.

As shown in FIG. 5B, assume user device 210 is in a non-operator network communication mode. For example, user device 210 may be in a Wi-Fi mode and establish a connection with a Wi-Fi device.

Further, assume a user of user device 210 executes an Internet browser application and navigates to a search engine webpage. The user may input a search request for "Food" into the search engine webpage. User device 210 may receive a HTTP request from the browser application for a webpage with search results for "Food." User device 210 may be configured to provide the HTTP request to be processed by the proxy application based on user device 210 being in the Wi-Fi mode. The proxy application may receive the HTTP request and generate a modified request by inserting the UIDH into a header of the HTTP request. User device 210 may send the modified request to a search engine server (e.g., content server 250) via Wi-Fi communication.

The search engine server may generate the search results (e.g., the requested content) based on the modified request. The search engine server may read the UIDH from the modified request and send the UIDH to an advertisement server (e.g., targeted content server 250). Assume the advertisement server has an agreement with operator network 220 to obtain UIDHs from operator network 220 (and/or UIDH server 230) and attribute information for subscribers associated with the UIDHs. However, operator network 220 (and/or UIDH server 230) may not share an identity of the subscribers with the advertisement server. The advertisement server may select an advertisement for the UIDH, received from the search engine server, based on the attribute information, received from operator network 220 and/or UIDH server 230, that is associated with the UIDH. For example, the attribute information associated with the UIDH may indicate that the subscriber is a 30 year old male that lives in Chicago. Accordingly, the advertisement server may select an advertisement for "Chicago Football Tickets 50% Off" based on the attribute information. Thus, the advertisement may be targeted content for the subscriber, associated with the UIDH, that conforms to attributes of the subscriber. The advertisement server may send the advertisement to the search engine server based on receiving the UIDH from the search engine server.

As shown in FIG. 5C, the search engine server may send the search results and the advertisement to user device. User device 210 may receive the search results and the advertisement and present the search results and the advertisement to the user (e.g., the subscriber). Accordingly, an advertisement targeted to a subscriber of operator network 220 may be provided to user device 210 even when user device 210 communicates using Wi-Fi communication or another type of non-operator network communication.

As indicated above, FIGS. 5A-5C are provided merely as an example. Other examples are possible and may differ from what was described with regard to FIGS. 5A-5C.

Implementations described herein may permit a UIDH generated for a subscriber of an operator network to be added to a content request even with the content request is not sent via the operator network. Accordingly, the subscriber may be provided with targeted content, based on the UIDH, even when the subscriber is not using the operator network to communicate.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A computer-readable medium storing instructions, the instructions comprising:
one or more instructions that, when executed by one or more processors of a device, cause the one or more processors to:
receive an identifier for a subscriber of an operator network,
the subscriber being associated with the device;
store the identifier;
receive a request for content;
generate a modified request by adding the identifier to the request;
send the modified request to a server via a first mode of network communication,
the first mode of network communication communicating without using the operator network, and
the device being capable of communicating using a second mode of network communication that communicates with the server via the operator network; and
receive the content and targeted content based on the modified request,
the targeted content being targeted to the subscriber and being selected based on the identifier.

2. The computer-readable medium of claim 1, where the one or more instructions, that cause the one or more processors to generate the modified request, further cause the one or more processors to:
generate the modified request based on an address included in the request,
the address indicating a destination to which the request for the content is to be sent.

3. The computer-readable medium of claim 1, where the one or more instructions, that cause the one or more processors to generate the modified request, further cause the one or more processors to:
generate the modified request based on a type of message indicated by the request for the content.

4. The computer-readable medium of claim 1, where the one or more instructions, that cause the one or more processors to generate the modified request, further cause the one or more processors to:
generate the modified request based on an application that generated the request for the content.

5. The computer-readable medium of claim 1, where the one or more instructions, that cause the one or more processors to generate the modified request, further cause the one or more processors to:
generate the modified request based on the request for the content being generated based on a user input.

6. The computer-readable medium of claim 1, where the one or more instructions, that cause the one or more processors to generate the modified request, further cause the one or more processors to:
generate the modified request based on the device being in the first mode of network communication.

7. The computer-readable medium of claim 1, where the identifier is associated with the subscriber without identifying an identity of the subscriber.

8. A method comprising:
receiving, by a device, an identifier for a subscriber of an operator network,
the subscriber being associated with the device;
storing, by the device, the identifier;
receiving, by the device, a request for content;
generating, by the device, a modified request by adding the identifier to the request;
sending, by the device and using a network communication, the modified request to a server,
the network communication communicating independent of the operator network;
receiving, by the device and from the server, the content and targeted content based on the modified request,
the targeted content being targeted to the subscriber and being selected based on the identifier.

9. The method of claim 8, further comprising:
providing the request for content to a proxy application based on the device being in a mode for communicating using the network communication, and
where generating the modified request includes the proxy application adding the identifier to the content request.

10. The method of claim 9, where storing the identifier further comprises:
storing the identifier to be accessible only by the proxy application.

11. The method of claim 8, where the identifier is generated based on a mobile device identifier associated with the subscriber.

12. The method of claim 8, further comprising:
sending an identifier request for the identifier,
the identifier request being sent independent of and prior to receiving the request for the content.

13. The method of claim 8, where generating the modified request further comprises:
determining a communication mode of the device; and
selectively generating the modified request based on the communication mode.

14. A device, comprising:
one or more processors to:
receive an identifier for a subscriber of an operator network,
the subscriber being associated with the device;
store the identifier;
receive a request for content;
generate a modified request by adding the identifier to the request;
send the modified request to a server via a first mode of network communication,
the first mode of network communication communicating independent of the operator network,
the device being capable of communicating using a second mode of network communication that communicates with the server via the operator network; and
receive the content and targeted content based on the modified request,
the targeted content being targeted to the subscriber based on the identifier.

15. The device of claim 14, where the one or more processors are further to:
send an identifier request to the operator network that requests the identifier; and
where the one or more processors, when receiving the identifier, are further to:
receive the identifier via the operator network based on sending the identifier request.

16. The device of claim 15, where the one or more processors, when sending the identifier request, are further to:
send the identifier request at a scheduled time that is based on how often the identifier for the subscriber is updated by the operator network.

17. The device of claim 15, where the one or more processors, when sending the identifier request, are further to:
send the identifier request based on the device connecting to the operator network.

18. The device of claim 14, where the identifier is generated based on a key and information associated with the subscriber.

19. The device of claim 14, where the one or more processors are further to:
determine that the device is in the first mode of network communication that communicates independent of the operator network, and
where the one or more processors, when generating the modified request, are further to:
add the identifier to the request based on the device being determined to be in the first mode of network communication that communicates independent of the operator network.

20. The device of claim 14, where the one or more processors are further to:
provide the content and the targeted content for presentation.

* * * * *